Figure 1:
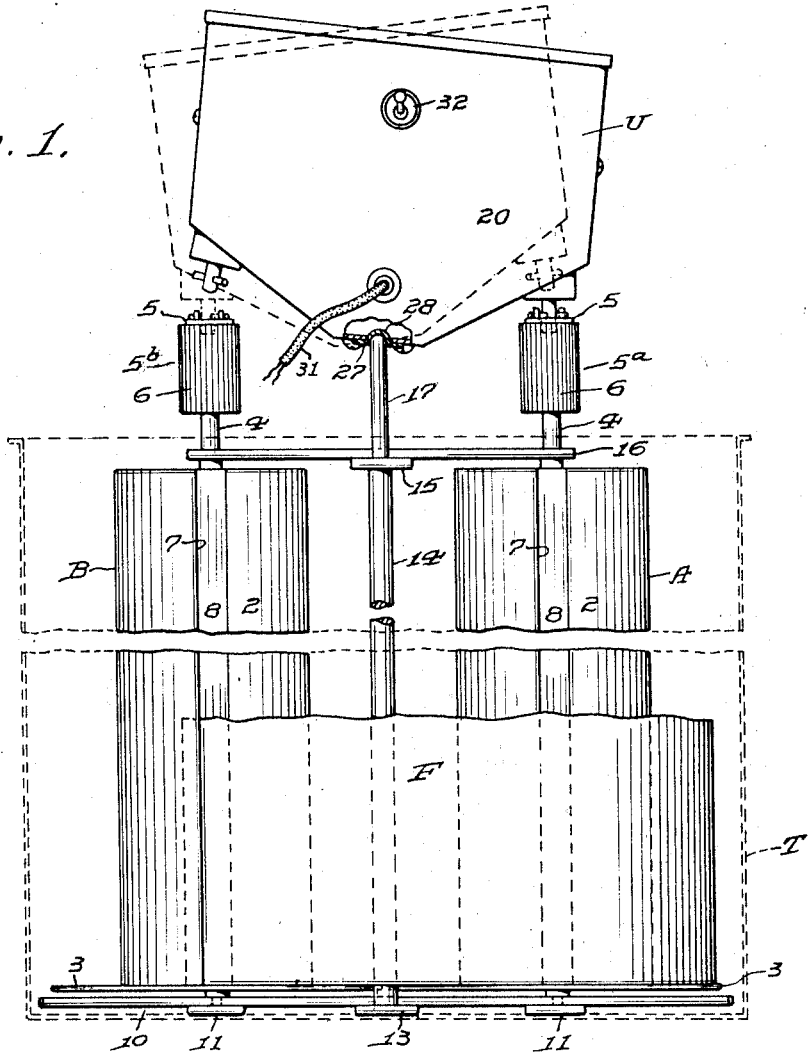

Aug. 14, 1934.                J. W. SMITH                1,969,823
                    AUTOMATIC FILM DEVELOPING APPARATUS
                    Filed Feb. 16, 1933      2 Sheets-Sheet 1

WITNESS
F. J. Hartman

INVENTOR
John Wesley Smith
BY George W. Helret
ATTORNEY

Aug. 14, 1934.   J. W. SMITH   1,969,823
AUTOMATIC FILM DEVELOPING APPARATUS
Filed Feb. 16, 1933   2 Sheets-Sheet 2
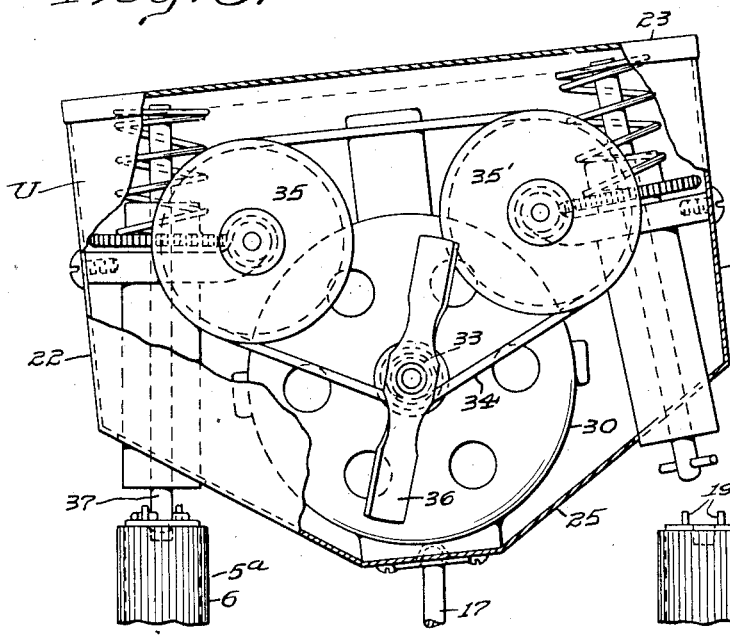
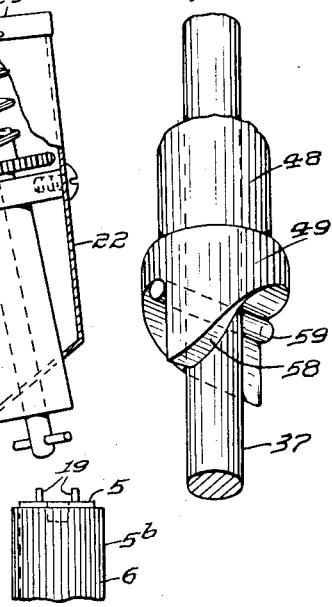
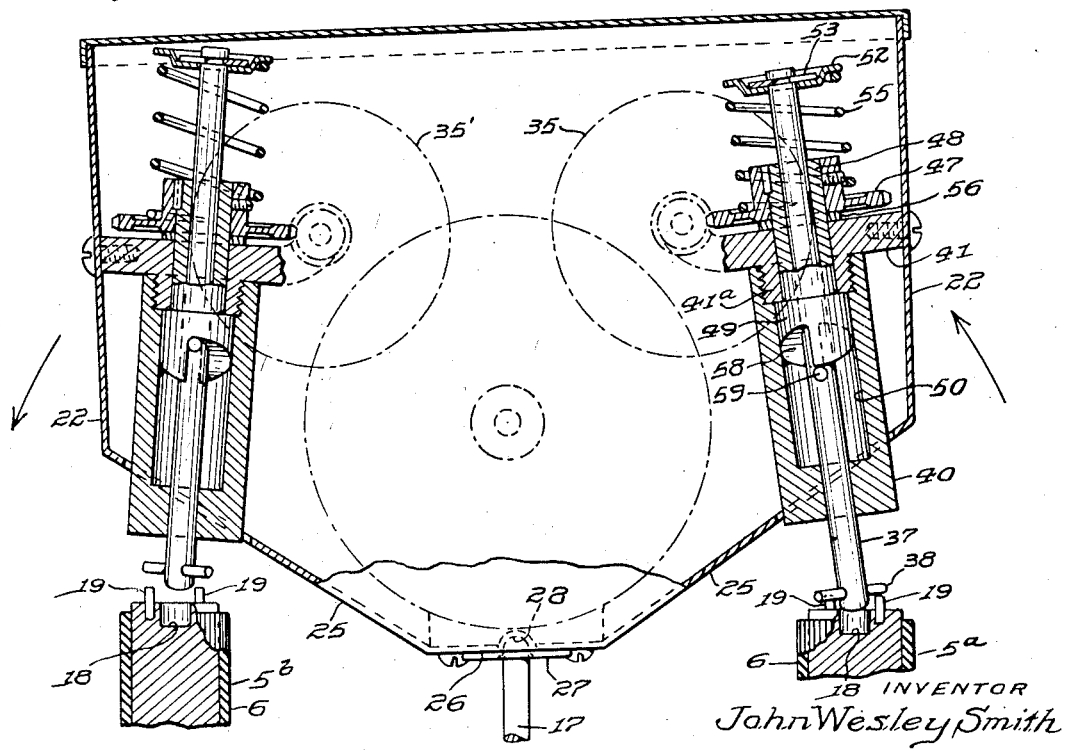
INVENTOR
John Wesley Smith
BY
ATTORNEY
WITNESS
F. J. Hartman Patented Aug. 14, 1934

1,969,823

UNITED STATES PATENT OFFICE 1,969,823

AUTOMATIC FILM DEVELOPING APPARATUS

John Wesley Smith, Gladwyne, Pa.

Application February 16, 1933, Serial No. 656,976

15 Claims. (Cl. 242—55)

Roll films of large size such as are used in aerial photography, map making and the like, are conveniently developed by apparatus of the character disclosed in U. S. Patent 1,860,059 granted to me May 4, 1932, said apparatus consisting essentially of a pair of film holding cylindrical reels mounted for revolution in a suitable frame and provided with means for clamping the ends of the film to the respective reels so that after the film has been wound on one of them, the frame and reels may be lowered into a tank of developer or other solution with the reel axes extending vertically and the reels then rotated so as to wind alternately the film, which rests on flanges at the lower ends of the reels, from one of the latter to the other. After the actual development is completed, the frame and reels with the film still wound on the latter, may be consecutively transferred to other tanks respectively containing washing water, fixing solution or the like or the different solutions introduced to the same tank in which the film was developed, and the operation of alternately winding the film from one reel to the other continued as long as may be necessary to properly wash and fix it. The labor thus involved when the winding is performed manually, as with a machine of the type disclosed in my said patent, is considerable and entails a good deal of fatigue; additionally, the manual winding frequently cannot be performed with the maximum rapidity permissible from the standpoint of adequate and proper film treatment so that the total time expended in developing, washing and fixing the film is thereby unnecessarily increased, a matter of considerable consequence in military and other photographic work in which ability to obtain a series of photographs as quickly as possible is often essential.

It is therefore the primary object of the present invention to provide a film developing apparatus of the general character of that forming the subject of my said patent but comprising mechanism for rotating the respective reels alternately in opposite directions to the end that the film wound on one of them may be drawn off and wound on the other and thereafter drawn from the latter and re-wound on the former as many times as may be desired by mechanical as distinguished from manually actuated means, the alternate application of the drive to the respective reels being entirely automatic and requiring no attention from the operator.

Further objects of the invention are the provision of driving mechanism for a pair of suitably supported reels to each of which is connected one end of a strip or the like of flexible material, said mechanism being adapted to selectively rotate either of the reels so as to unwind the material initially disposed on the other reel and wind it on the one being rotated and at the completion of such winding to automatically disconnect the drive from the reel upon which the material has just been wound and connect it with the now empty reel so as to reverse the direction of movement of the material and again wind it onto the reel on which it was initially disposed, the mechanism being capable of performing these operations successively as long as may be desired.

Still further objects of the invention are the provision of film developing apparatus embodying driving mechanism of the character aforesaid which is of comparatively simple form and construction, compact, portable, and thus capable of convenient use in the field, not liable to get out of order under the conditions of use to which developing outfits are necessarily subjected, and which in its preferred embodiment is actuated by electrical power.

Other objects, advantages and novel features of design, construction and arrangement comprehended by the invention are hereinafter more particularly pointed out or will be apparent to those skilled in the art from the following description of one embodiment thereof as illustrated in the accompanying drawings.

It will be understood, however, that while the invention particularly lends itself to employment in apparatus of the character of that to which I have referred, namely, that designed for development of large size roll films, its principles may be employed with equal facility in many other arts in which it is desired to wind a length of material, be it in the form of a flexible strip, ribbon, thread or the like, on one of a pair of reels while unwinding it from the other and to then automatically reverse the operation, and, consequently, that while I shall herein refer more particularly to an embodiment of the invention designed for the development of roll films, such reference is by way of example only and not to be construed as limiting or restricting the use of the invention solely to machines designed for that purpose.

Figure 2:
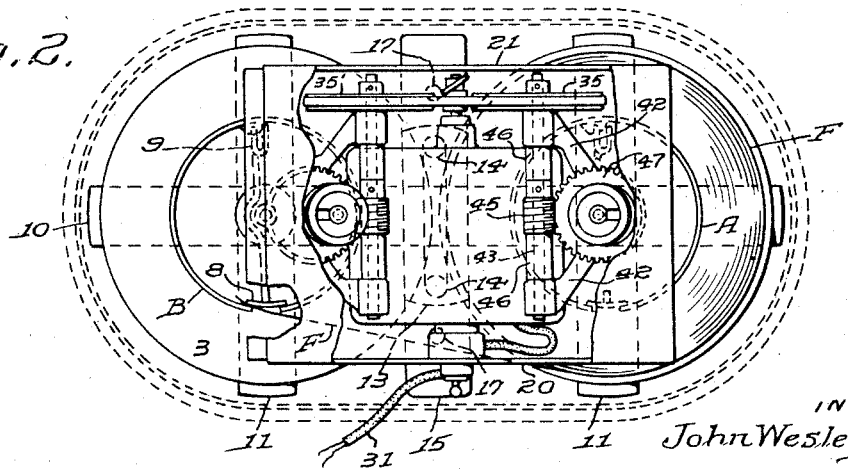

In the said drawings,

Fig. 1 is a front elevation of the apparatus hereinafter specifically described with certain parts broken away for the sake of clearness, the position of the driving unit when the right hand reel, viewed as in the drawings, is being driven, being shown in full lines and the position of the unit when the left hand reel is being driven being indicated in dotted lines, and Fig. 2 is a top plan view of the apparatus as shown in full lines in Fig. 1, the cover of the driving unit being fragmentarily broken away. In these two views, the tank in which the reels and film are immersed during development is also indicated in dot-and-dash lines.

Fig. 3 is a rear elevation, on a somewhat larger scale, of the driving unit and portions of adjacent parts as shown in full lines in the preceding figures, the casing of the unit being fragmentarily broken away.

Fig. 4, on a still larger scale, is a vertical central section through the unit and adjacent parts showing certain of the operating mechanism in full lines, other parts thereof being merely indicated in broken lines, this figure being designed more particularly to show the action of the driving unit when the drive is being transferred from one reel to the other, and Fig. 5 is a fragmentary enlarged detail view of a portion of the driving unit mechanism.

Throughout the drawings, the same characters of reference are used to designate the same parts.

Referring now more particularly to the drawings, that part of the apparatus designed to support the film comprises a pair of reels A, B of identical construction, so that a description of but one is necessary. The body 2 of each reel is preferably formed of hollow tubing and provided at its lower end with a flange 3 adapted to afford vertical support to the film, while extended axially through the body and rigidly secured thereto in any suitable way as by spiders (not shown) disposed within the body, is a shaft 4 having a stepped bearing at its lower end and at its upper end a head 5 (designated as 5a and 5b respectively, desirably faced with rubber 6 to afford a convenient grip for the fingers if it be desired to rotate the reel manually. Each reel is also provided with means for clamping an end of the film to it, and for this purpose I prefer to form a narrow slot 7 in the wall of the reel body and dispose in the rear thereof a plate 8 wide enough to overlap the slot on each side and adapted to be forced against the inner face of the body by moving from one position to another a spring control element 9 located on the opposite side of the body from the plate and interconnected with the plate. Thus, by lifting the control member, the plate may be caused to move away from the slot sufficiently to permit the insertion of one end of the film F between the plate and inner face of the body 2 after which by pushing the control member back to initial position, the plate can be forced against the reel wall so as to clamp the end of the film snugly against it. While means of this character are convenient and satisfactorily perform the requisite function of clamping the film end to the reel, any other means suitable for the purpose may be utilized if preferred.

The reels are supported in a frame comprising a longitudinally extending bottom member 10 and cross members 11 extending transversely thereof beneath each reel, the several members, which are welded or otherwise secured together, forming a base adapted to firmly support the reels in vertical position. At the center of the member 10 is another shorter cross member 13 from which a pair of uprights 14 extend and at their extremities support an upper cross member 15 overlying and secured to which is a longitudinally extending top member 16 drilled for the passage of the shafts 4 the lower ends of which are rotatably received in holes in the bottom member 10 so that the shafts are freely rotatable in the frame. The cross member 16 also serves to support a pair of upwardly extending posts 17 having rounded upper ends; these posts are spaced relatively widely apart and serve as the principal support for the driving unit. The frame and reels thus form a self-contained unit adapted to be lowered into the tank T in which the developer or other solution is contained after the film is disposed on the reels. When so disposed, the frame supports the reels in upright position in the tank with the heads 5 projecting above its upper edge as shown in Fig. 1.

It will therefore be apparent that that portion of the apparatus heretofore described is closely similar to that disclosed in my said Patent 1,860,059 save that in the latter the upper ends of the shafts are shown as provided with cranks to facilitate their manual rotation instead of with the heads 5. In accordance with the present invention, the upper end of each head is, as best shown in Fig. 4, axially countersunk for a short distance and provided on each side of the bore 18 thus formed with a pair of diametrically opposed upwardly projecting pins 19, each pair of pins forming in effect one member of a clutch through which connection with the driving unit may be effected.

Reference will now be made to this unit, generally designated as U, through the medium of which rotation of the shafts 4 is selectively and alternately effected. It comprises a preferably sheet metal casing rectangular in planary outline and open at the top, having a front 20, back 21 and ends 22, a removable cover 23 being preferably provided to prevent the entrance of dust and dirt. The bottom of the casing has its end portions 25 sloped rather sharply oppositely inwardly from the ends 22 to merge into a flat portion 26 at its center extending transversely of the casing. To this portion is welded or otherwise secured a plate 27 provided with a pair of laterally spaced indentations 28 adapted to respectively receive and generally conform to the upper ends of the posts 17, the casing bottom being cut away as required to receive the metal of the plate surrounding the indentations as best shown in Fig. 4. Thus the casing can be removably seated on the posts 17 and is then capable of oscillation in a vertical plane about the posts as a center, the extent of this movement in either direction being limited as hereinafter described.

Within the casing and firmly secured to the bottom thereof, is a driving motor 30, preferably one adapted to use either alternating or direct current supplied through a cord 31 which may be connected to any suitable source of current supply, a switch 32 interposed in the cord and secured to the casing wall controlling the flow of current to the motor; this switch may be of any suitable type, and no attempt has been made to specifically illustrate its construction. The motor shaft carries a pulley 33 over which extends an endless belt 34 which also passes over two similar pulleys 35, 35' which are thus driven in the same direction as the motor, and is preferably provided with a fan 36 to assist in keeping the motor cool.

The power supplied by the motor through the belt 34 to the pulleys 35 is transmitted by each of the latter to separate though identical mechanisms, so a description of one of them will apply equally to the other. Thus, the mechanism associated with the pulley 35, for example, comprises a shaft 37 provided near its lower end with a transversely extending pin 38 adapted to cooperate with the pins 19 on the generally subjacent head 5a of reel A, so that when the pin 38 is entered between the pins 19 and the shaft rotated, the head will be correspondingly turned, the extremity of the shaft entering the bore 18 in the head so as to center the shaft with respect to the latter when reel A is being driven. The shaft 37 extends upwardly and rotatably through the lower end of a housing 40, the uper end of which is screwed to a boss 41a on the lower side of a bracket 41 secured to the adjacent end 22 of the casing in such position that the axis of the housing is inwardly inclined toward the center of the casing when the upper edge of the latter is horizontal, whereby when the pin 38 rests on the end of the subjacent head 5a and the casing is thus tilted to the right as shown in full lines in Fig. 1, the shaft 37 is in substantial prolongation of the adjacent reel shaft 4.

At its inner end the bracket 41 is provided with a pair of divergent arms 42 respectively bored adjacent their extremities for passage of the worm shaft 43 which is thus journaled in the arms and extends in a generally horizontal position transversely of the casing. This shaft supports at one of its ends beyond the adjacent arm the pulley 35 and, substantially at its midpoint, a worm 45, the pulley and the worm being pinned to the shaft so as to turn therewith, spacer sleeves 46 surrounding the shaft between the bracket arms restraining the shaft from longitudinal movement. The worm 45 is in meshing engagement with a worm gear 47 which is mounted on and removably fixed to the upper end of a sleeve 48 having an integral head 49 forming a good fit in the cylindrical bore 50 in the housing and abutting the face of the boss 41a, the sleeve forming a bearing for the shaft 37 which projects considerably above the upper end of the sleeve and at its extremity is provided with a washer 52, of considerably greater diameter than the shaft, removably locked thereto in any suitable way, conveniently by a split washer 53 cooperative with a groove in the end of the shaft. Between the washer and the upper face of the gear 47 is disposed a coil spring 55, the gear being desirably provided with an upstanding hub which enters the spring and serves to hold it substantially axial with the shaft. The lower face of the washer is also preferably downwardly cupped so as to similarly hold the upper end of the spring while a thin washer 56 is disposed between the gear 47 and upper face of the bracket to form a bearing seat for the gear.

The lower end face of the head 49 is formed to provide a cam, generally designated as 58, having two diametrically opposed high points and two correspondingly diametrically opposed low points, this cam being cooperative with a pin 59 projecting in opposite directions from the shaft 37, the spring 55 normally yieldingly holding the pin at the low points of the cam as shown at the left hand side of Fig. 4 and in Fig. 5.

Brief reference will now be made to the operation of the apparatus when constructed substantially as hereinbefore described: The reels and their supporting frame are first lifted from the tank T, the leading end of the film which is to be developed clamped to one of the reels, for example, reel B, and the film then wound onto that reel by manually rotating the head 5b, the driving unit U of course being removed. The other end of the film, which can now be reached, is then clamped to reel A and the frame and reels lowered into the tank T containing the developing solution. The head 5a is now preferably rotated a few turns by hand to determine if the film is leading properly from one reel to the other, and the operating unit then placed on the posts 17 and inclined to a position in which the end of the shaft 37 adjacent the head 5a will enter the countersink in that head and the pin 38 engage pins 19, thus connecting said shaft 37 with shaft 4 of reel A. Current is now switched on the motor 30 by the switch 32, thus setting both shafts 37 in motion in opposite directions since the cam heads 49 are positively driven and cooperate with the pins 59, now in the low points of the cams, to turn the shafts. Consequently, reel A is driven in a direction (counterclockwise when viewed as in Fig. 2) to wind the film onto that reel from reel B which is free to turn under the pull of the film since the inclined position of the driving unit, in which it is maintained by gravity as it is in overbalanced condition to the right, keeps the end of shaft 37 adjacent head 5b a sufficient distance above that head to clear it entirely, and said shaft thus merely rotates in the air. However, when no further turns of film are left on reel B, a more than normal load or drag is thrown onto reel A and shaft 37 connected therewith as the end of the film is clamped to reel B, and as the motor continues to turn head 49, the cam-shaped end thereof starts to climb on pin 59 which is now held stationary or substantially so, so that the head and all of the parts positively connected therewith including the unit casing move upwardly relatively to the shaft and are thus swung to the left about the posts 17, the spring 55 on the side of the unit adjacent reel A being compressed between gear 47 on which its lower end abuts and washer 52 as shown in Fig. 4. The height of the cam on head 49, that is, the distance between its high and low points, is so calculated that this swinging movement of the unit is continued until the unit is carried over center, whereupon the unit falls by gravity until connection is effected between head 5b and adjacent shaft 37, as shown in dotted lines in Fig. 1, thus initiating positive rotation of reel B in the opposite direction from that in which it turned while the film was being unwound from it. Substantially simultaneously with the movement of the unit over center, or slightly thereafter, cam head 49 adjacent reel A passes over its high point, thus permitting its pin 59 under the influence of spring 55 to snap back to its low point, thus disconnecting pin 38 from head 5a and placing reel A in condition to turn freely as reel B starts its rotation and consequent winding of the film in reverse direction, that is, from reel A to reel B.

The sequence of operations just described consequently takes place whenever a sufficient load is thrown on the reel which is being driven, as when substantially all of the film has been wound thereon, to retard the revolution of shaft 37 connected therewith and thereby cause the adjacent cam head 49 to climb on its pin 59 and swing the unit as a whole over center with resultant connection of the other shaft 37 with the other reel.

After the film has thus been wound from one reel to the other alternately for a sufficient number of times to complete development, the current is switched off, the driving unit lifted from posts 17, and the reel frame and reels with the film wound on one of them removed from the tank and placed in another tank containing the washing or fixing solution or the like, or the first tank may be emptied and filled with the next required solution and the reels and frame again placed in it, for a further treatment of the film, the driving unit being again set in place after the film is in the tank and employed to alternately wind the film from one reel to the other. In this way very rapid development, washing and fixing of the film is possible, and as the operations incident to the winding and reversal of direction of the movement of the film are entirely automatic after the motor has once been started, no attention is required on the part of the operator save when the film is to be transferred to a different solution.

It will be apparent from the foregoing that while the principles of the invention may be employed with particular advantage in apparatus intended for the development of roll films, they may also be utilized in many other forms of apparatus designed for use in various other arts. In consequence, I desire it to be understood that although I have herein referred with considerable particularity to one form of apparatus constructed in accordance with the invention, I do not thereby desire or intend to restrict or confine myself thereto or to any particular details in the design, construction and arrangement of the parts thereof, as within the limits of the appended claims numerous changes and modifications may be made therein and the principles of the invention employed in apparatus intended for purposes other than the development of roll films without departing from its true spirit and scope.

Having thus described my invention, I claim and desire to protect by Letters Patent of the United States:

1. Apparatus of the class described comprising a pair of reels, means supporting said reels for rotation, and means for alternately driving said reels comprising a driving unit including a source of power, a pair of shafts selectively engageable with the reels, means for supporting the unit adjacent thereto for movement from a position in which one of said shafts is in driving relation with one reel to another position in which the other shaft is in driving relation with the other reel, and means respectively interconnecting each shaft with said source of power operative to move said unit from one of said positions to the other when the reel then being driven is subjected to greater than normal resistance to rotation.

2. Apparatus of the class described comprising a pair of reels, means for supporting the reels for rotation, and means for selectively driving the reels comprising a unit movably disposed adjacent the reels and including a source of power, separate driving means respectively cooperative with the reels when the unit is in different positions, and means respectively adapted to interconnect the power source and each of said separate driving means, comprising resilient means adapted to yield when excessive torsional load is impressed on the adjacent driving means by its corresponding reel to thereby disconnect said driving means therefrom and move said unit to another position.

3. Apparatus of the class described comprising a pair of reels, means for supporting the reels for rotation on vertical axes, and means for alternately driving said reels comprising a driving unit supported for oscillation in a vertical plane and including a pair of shafts respectively disposed above the reels each adapted for driving engagement with the subjacent reel, a motor, means interconnecting the motor with the shafts operative to drive them simultaneously, and means for automatically tilting the unit in response to the imposition of a greater than normal load on one of the shafts from a position in which said shaft is effective to drive the subjacent reel to a position in which the other shaft is effective to drive the other reel.

4. Apparatus of the class described comprising a pair of reels, means for supporting the reels for rotation on vertical axes, means for selectively driving said reels comprising a driving unit, means for supporting the unit above the reels for tilting movement about a horizontal axis, said unit including means operative to drive one of the reels when the unit is tilted to one position and to drive the other reel when the unit is tilted to another position, and means for automatically tilting said unit from one position to the other when a greater than normal load is thrown onto the driven reel.

5. Apparatus of the class described comprising a pair of reels, means for supporting the reels for rotation on vertical axes, and means for alternately driving said reels comprising a driving unit, means for supporting the unit above the reels for oscillation over center about a horizontal axis, the unit being in overbalanced condition when inclined to either side of the vertical plane containing said axis and, included in the unit, a motor, a pair of shafts each adapted to make driving connection with the reel most nearly adjacent thereto when the unit is tilted toward that reel, means driving the shafts simultaneously from the motor, and means adapted to swing the unit over center to thereby disconnect one shaft from its adjacent reel and interconnect the other shaft with the other reel when a more than normal load is thrown on the driven reel.

6. In apparatus of the class described, a pair of reels, a frame supporting the reels for rotation on vertical axes, clutch means associated with each reel, and means for alternately positively driving the reels comprising a driving unit including a pair of shafts having clutch means respectively engageable with the clutch means of the reels, a motor, means operative to drive the shafts simultaneously therefrom, means adapted to support the unit above the reels for oscillation about a horizontal axis from a position in which the clutch means of one shaft is engaged with the clutch means of the adjacent reel to a position in which the clutch means of the other shaft is engaged with the clutch means of the other reel and the first mentioned clutch means are disengaged, and means for automatically swinging said unit from one of said positions to the other when a more than normal load is thrown on the reel whose clutch means are then engaged.

7. In apparatus of the character described, a driving unit comprising a casing, a motor disposed therein, and, on each side thereof, a shaft, a housing through which the shaft extends, a support for the housing fixed with respect to the casing, a sleeve surrounding the shaft, a cam at the lower end of the sleeve, a pin carried by the shaft, means for driving the sleeve from the motor, and yieldable means normally holding the pin in such relation with the cam that the shaft is turned therewith, the cam being operative to cause relative axial movement between the sleeve and the shaft in opposition to said yielding means when an overload is thrown on the shaft.

8. In apparatus of the character described, a driving unit including a motor and, on opposite sides thereof, substantially similar mechanisms each comprising a rotatable shaft, a rotatable cam, means for driving the cam from the motor, means carried by the shaft cooperable with the cam, and means for normally yieldingly maintaining the last mentioned means in such relation with the cam that rotation thereof is effective to turn the shaft, said cam operating to cause relative axial movement of the shaft with respect to the cam when an overload is thrown on the shaft.

9. In apparatus of the character described, a driving unit including a motor and on opposite sides thereof, substantially similar mechanisms each comprising a rotatable shaft, a sleeve surrounding the shaft, a cam at an end of the sleeve, a pin carried by the shaft, means for driving the sleeve from the motor, supporting means for the driving means, and means for normally yieldingly maintaining the pin in such relation with the cam that rotation of the sleeve is effective to turn the shaft, said cam operating to cause relative axial movement of the shaft with respect to the sleeve in opposition to said yielding means when an overload is thrown on the shaft.

10. In apparatus of the character described, a driving unit including a motor and on opposite sides thereof, substantially similar mechanisms each comprising a rotatable shaft, a sleeve surrounding the shaft, a cam at an end of the sleeve, a pin carried by the shaft, means for driving the sleeve from the motor, supporting means for the driving means, and means for normally yieldingly maintaining the pin in such relation with the cam that rotation of the sleeve is effective to turn the shaft, said cam operating to cause relative axial movement of the shaft with respect to the sleeve in opposition to said yielding means when an overload is thrown on the shaft and said yielding means operating to cause like movement of the shaft in the opposite direction to return the pin to normal relation with the cam after the latter has completed a partial revolution with respect to the overloaded shaft.

11. In apparatus of the character described, a driving unit comprising a motor and mechanism including a driving shaft having a transversely extending pin, a sleeve surrounding the shaft, a cam carried by the sleeve cooperative with the pin, means for driving the sleeve from the motor, and means for yieldingly holding the shaft and the pin in such relation to the cam that the sleeve and shaft will rotate together when the sleeve is driven by the motor and the shaft is under normal or less than normal load, said cam when a more than normal load is imposed on the shaft being operative to make a partial revolution with respect thereto to thereby move the shaft axially relatively to the cam in opposition to said yielding means.

12. In apparatus of the character described, a driving unit comprising a motor and mechanism including a driving shaft having a transversely extending pin, a sleeve surrounding the shaft, a cam carried by the sleeve cooperative with the pin, means for driving the sleeve from the motor, and means for yieldingly holding the shaft and the pin in such relation to the cam that the sleeve and shaft will rotate together when the sleeve is driven by the motor and the shaft is under normal or less than normal load, said cam when a more than normal load is imposed on the shaft being operative to make a partial revolution with respect thereto to thereby move the shaft axially relatively to the cam in opposition to said yielding means and said yielding means serving to return the shaft to normal position with respect to the cam after the latter has completed said partial revolution.

13. In apparatus of the character described, a pair of vertically disposed reel shafts having heads provided with clutch means, a driving unit, means disposed between the shafts for supporting said unit for oscillation over center about a horizontal axis, said unit including a pair of driving shafts having clutch means at their lower ends respectively engageable with the clutch means of the reel shafts and when so engaged cooperative with said supporting means to maintain the unit in overbalanced but relatively fixed position, a motor, means forming a driving connection between the motor and each of said driving shafts including a rotatable cam, a pin carried by the shaft, means normally yieldingly holding the pin in such relation with the cam that when the latter is rotated, the shaft turns unitarily therewith to thereby correspondingly turn the adjacent reel shaft if engaged therewith, the cam, when an overload is thrown on said reel shaft, being adapted to ride up on the pin while rotating relatively to the driving shaft and thereby swing the unit over center to engage the other drive shaft with the other reel shaft, said yielding means operating to return the first unit shaft to normal relation with the cam after the unit has been moved over center.

14. In apparatus of the character described, a pair of vertically extending reel shafts, a driving unit comprising a power source and, on opposite sides thereof, substantially similar mechanisms, each including a drive shaft and means for continuously driving said shaft from the power source, means for supporting the unit above the reel shafts for oscillation about a horizontal axis from an overbalanced position on one side of the vertical in which one of the drive shafts is engaged with the adjacent reel shaft to a correspondingly overbalanced position on the other side thereof in which the other drive shaft is engaged with the other reel shaft, and means comprised in the driving unit for moving the engaged drive shaft axially with respect to the unit when an overload is thrown on the adjacent reel shaft to thereby swing the unit over center and engage the other driving shaft with the other reel shaft.

15. In apparatus of the character described, a pair of vertically extending reel shafts, a driving unit comprising a power source and, on opposite sides thereof, substantially similar mechanisms each including a drive shaft, means for continuously driving said shaft from the power source, and yielding means for normally holding the shaft against axial movement in one direction, means for removably supporting the unit above the reel shafts for oscillation over center about a horizontal axis from a position in which one of the drive shafts is in driving engagement with one of the reel shafts to another position in which the other drive shaft is in driving engagement with the other reel shaft, and means for effecting in opposition to said yielding means relative axial movement with respect to its driving means of whichever drive shaft is so engaged whenever an overload is thrown on the adjacent reel shaft to thereby swing the unit over center, engage the other drive shaft with the other reel shaft and disengage the first drive shaft with the first mentioned reel shaft.

JOHN WESLEY SMITH.